United States Patent [19]

Foster

[11] 3,903,473

[45] Sept. 2, 1975

[54] PHASE LOCKING CIRCUITS UTILIZING BRIDGE CONTROLLED CLOCK WITH FEEDBACK

[75] Inventor: Raymond F. Foster, Fridley, Minn.

[73] Assignee: Control Data Corporation, Minneapolis, Minn.

[22] Filed: Apr. 22, 1974

[21] Appl. No.: 463,008

[52] U.S. Cl. .................. 328/29; 307/261; 307/269; 328/62; 328/63; 328/179; 328/208; 331/21; 331/26

[51] Int. Cl.²... H03K 5/08; H03K 1/17; H03F 3/04

[58] Field of Search ............ 331/21, 26; 328/28, 29, 328/32, 63, 62, 72, 74, 179, 208; 307/269, 261

[56] References Cited

UNITED STATES PATENTS

| | | | |
|---|---|---|---|
| 2,389,025 | 11/1945 | Campbell | 331/21 |
| 2,389,948 | 11/1945 | Bartels | 331/21 |
| 2,437,609 | 3/1948 | Mayle | 331/21 |
| 3,358,242 | 12/1967 | Hillman | 331/26 |
| 3,753,143 | 8/1973 | Aguirre | 331/26 |

FOREIGN PATENTS OR APPLICATIONS

| | | | |
|---|---|---|---|
| 1,236,746 | 6/1960 | France | 331/26 |

*Primary Examiner*—Stanley D. Miller, Jr.
*Attorney, Agent, or Firm*—Robert M. Angus

[57] ABSTRACT

Apparatus is provided for producing pulses synchronous with the phase and frequency of an unregulated alternating signal. An electrical bridge is provided having a pair of rectifiers and a pair of impedance devices forming the legs thereof. The unregulated signal is applied to the junction between the diodes and voltage-controlled clock means is connected to the junction between the impedance devices. The clock drives logic which provides positive and negative pulse train outputs whose rates are dependent upon the signal from the bridge, and returns the pulse trains to opposite sides of the bridge. If the pulse trains are out of frequency with the unregulated signal, the bridge becomes unbalanced in such a manner as to alter the frequency rate of the clock.

8 Claims, 1 Drawing Figure

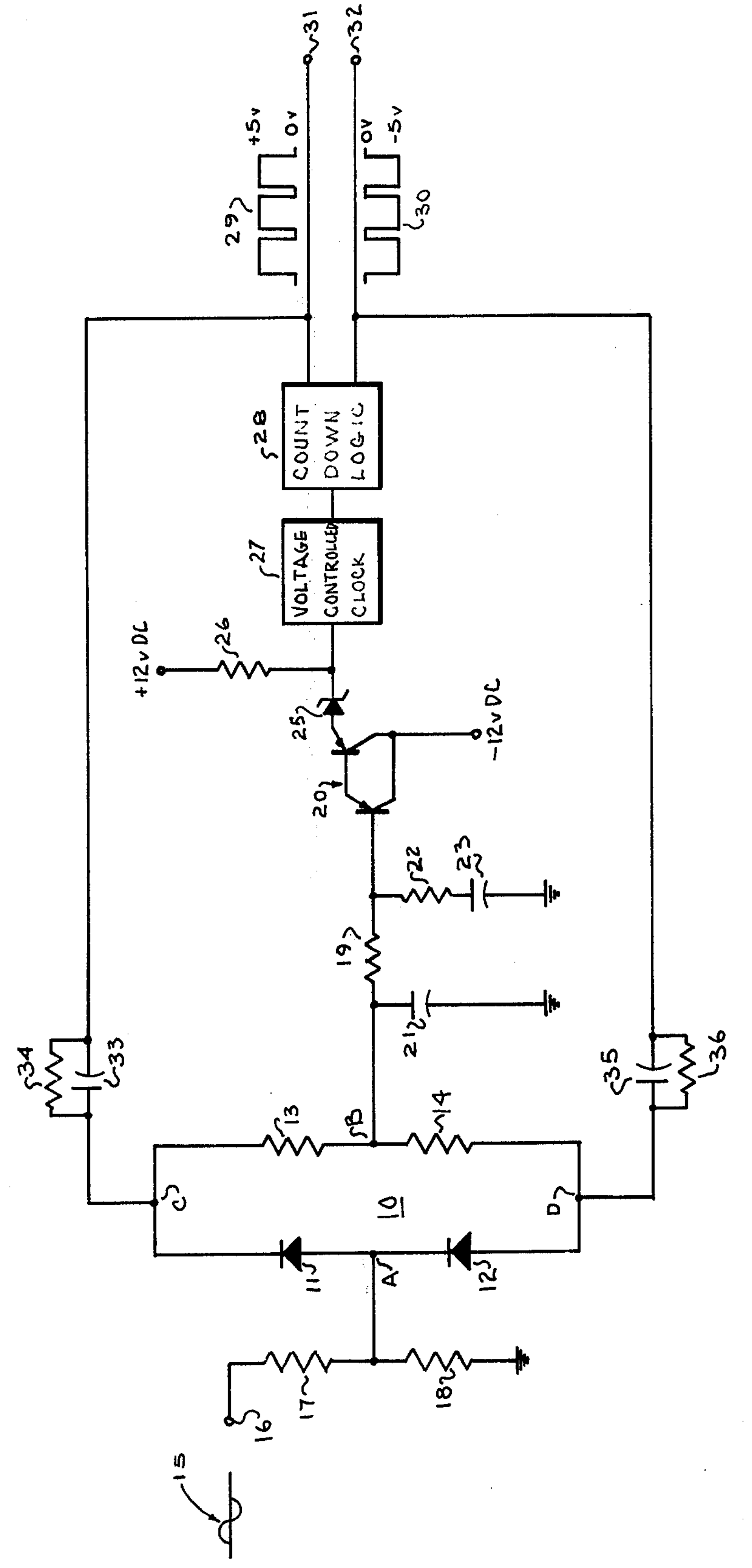
COUNT DOWN LOGIC
VOLTAGE CONTROLLED CLOCK
+12v DC
-12v DC
+5v
0v
-5v
A
B
C
D
10
11
12
13
14
15
16
17
18
19
20
21
22
23
25
26
27
28
29
30
31
32
33
34
35
36

PHASE LOCKING CIRCUITS UTILIZING BRIDGE CONTROLLED CLOCK WITH FEEDBACK

This invention relates to frequency locking circuits, and particularly to circuits for locking the phase and frequency of a display refresh cycle of a display device to the power line phase and frequency.

Data display devices, such as alphanumeric data readout devices utilizing a cathode ray tube, display alphanumeric data and "refresh" the display numerous times per second. Particularly, the display screen is selectively energized to display alpha-numeric characters, the display being re-energized or "refreshed" numerous times per second for the duration of the display. Ordinarily, the display refresh rate is fixed by suitable digital clocks, or the like, associated with the logic circuitry of the data display device. Heretofore, display refresh cycles have been timed by a crystal-controlled clock providing pulse outputs intended to correspond to the power line rate, such as 60 Hertz. However, the frequency of commercially available power ordinarily varies from its normal frequency during various times of the day. Thus, during periods of relatively heavy demand on a power generator, the frequency may drop to slightly less than the normal 60 Hertz rate, whereas during periods of relatively light demand, the power frequency may raise to slightly higher than the normal 60 Hertz rate.

Slight variations in the power frequency may cause a beat frequency between crystal-generated signals for data refresh purposes and the power line frequency, and flux thus generated from power transformers and other power equipment will induce a slow display movement to the display appearing on the cathode ray tube screen. Although the effect of this stray flux can be minimized through the use of expensive shielding, it is difficult to completely eliminate all raster movement.

Circuits for locking the clock rate to the power line have been proposed, but heretofore such circuits required complex phase-locked loops. Further, such circuits have not been altogether successful due to the induction of signals onto the refresh signal causing the display to vibrate or "bounce" on the display screen.

It is an object of the present invention to provide a circuit for locking the phase and frequency of the refresh cycle of a display device to the power line frequency, utilizing apparatus having relatively minimal cost.

It is another object of the present invention to provide a phase and frequency locking circuit wherein a portion of the synchronized output is fed back through a diode bridge arrangement to control the frequency of a clock.

It is another object of the present invention to provide a phase and frequency locking circuit which is more effective in operation than prior circuits.

The above and other features of this invention will be more fully understood from the following detailed description and the accompanying drawing, in which the sole FIGURE is a block circuit diagram of a phase and frequency locking circuit in accordance with the presently preferred embodiment of the present invention.

Referring to the drawing, there is illustrated a phase and frequency locking circuit having a bridge 10 having diodes 11 and 12 and resistors 13 and 14 forming the legs thereof. An AC (alternating current) signal, diagrammatically illustrated at 15, is applied to point A of the bridge via terminal 16 and the voltage divider consisting of resistors 17 and 18. As shown in the drawing, point A is located between the anode of diode 11 and the cathode of diode 12. The output of bridge 10 is taken from point B at the junction between resistors 13 and 14 through resistor 19 to the control electrode of transistor pair 20. Preferably, the voltage at point B is stabilized through capacitor 21 to ground, and the signal at the control electrode of transistor pair 20 is stabilized via resistor 22 and capacitor 23. One of the primary electrodes of transistor pair 20 is connected to negative DC (direct current) voltage source, such as −12 volts DC, and the other is connected through Zener diode 25 to voltage controlled clock 27. The input of voltage controlled clock 27 is also connected through resistor 26 to a source of positive DC (direct current) voltage source, such as +12 volts DC. The output of clock 27 is connected to count down logic 28.

Logic 28 provides two outputs, one providing a positive pulse train shown diagrammatically at 29 and the other providing a negative pulse train shown diagrammatically at 30. As shown on the drawings, the duty cycle of the pulses is greater than 50%, so that each signal is at zero volts for a small percentage (e.g. 7%) of the duty cycle. The output pulse signals 29 and 30 are supplied to output terminals 31 and 32, respectively. Further, the positive output pulse train associated with terminal 31 is fed via capacitor 33, and its parallel connected bleed resistor 34, to terminal C of bridge 10 between the cathode of diode 11 and resistor 13, and the negative pulses supplied to terminal 32 are fed through capacitor 35, and its parallel connected bleed resistor 36, to terminal D of bridge 10 between the anode of diode 12 and resistor 14.

In operation of the apparatus illustrated in the drawing, the peak value of the voltage of the alternating signal supplied to point A from terminal 16 is preferably less than the voltages provided by pulses 29 and 30. It will be noted that pulse train 29 and 30 are exactly 180° out of phase so that when one pulse signal 29 is at zero volts, the other pulse signal 30 is also at zero volts, whereas when pulse signal 29 is at +5 volts DC, the other pulse signal 30 is −5 volts DC. Therefore, the application of the pulse signals 29 and 30 to points C and D of the bridge, respectively, has a cancelling effect through diodes 11 and 12. If the phase of signal 15 is exactly at zero volts when signals 29 and 30 are at zero volts, there will be no conduction in diodes 11 and 12. Further, if signal 15 is at its peak when signal 29 and 30 are providing positive and negative signals respectively, and if the peak value of signal 15 is less than that of signals 29 and 30, diodes 11 and 12 will not conduct by virtue of the reverse biasing of both diodes 11 and 12 by the signals 29 and 30. Preferably, the peak value of signal 15 at point A is about ±4 volts, However, should the frequency or phase of signal 15 become different from the pulse rates of trains 29 and 30, bridge 10 will become unbalanced thereby supplying a signal to transistor 20. Particularly, if the phase of the line voltage is such that the voltage at point A becomes positive, diode 11 will conduct so the voltage at point C will exceed +5 volts while the voltage at point D will remain at −5 volts DC due to the charge on capacitor 35. With an increased positive voltage at point C, a voltage drop will appear across resistor 13 to raise the voltage at point B of the bridge thereby altering the conduction of transistor 20. The output of transistor 20 controls voltage controlled clock 27 thereby changing the frequency to logical counters 28 to alter the frequency of pulses (duty cycles) 29 and 30 until they become phase locked with signal 15. Conversely, if the frequency of the input signal 15 is such that the signal appearing at point A swings negatively, diode 12 conducts thereby supplying a more negative signal to point B to drive transistor 20 in the opposite fashion. The output pulses 29 and 30 may be supplied to the cathode ray tube to refresh the data appearing thereon so that the refresh cycle is synchronous with the power line signal. While the resulting display may have a fixed displacement of the overall raster, it is evident that no raster movement will result or be apparent.

The present invention thus provides apparatus for synchronizing pulses to the line rate, and is highly useful and effective, particulary in data display devices.

This invention is not to be limited by the embodiment shown in the drawing and described in the description, which is given by way of example and not of limitation, but only in accordance with the scope of the appended claims.

What is claimed is:

1. Apparatus for producing pulses at a rate synchronous with the frequency of an unregulated alternating signal, said apparatus comprising:

input means for receiving said unregulated alternating signal;

electrical bridge means including first and second rectifier means each having an anode and a cathode, said rectifier means being connected together so that the anode of the first rectifier means is connected to the cathode of the second rectifier means, said input means being connected to the junction between said first and second rectifier means, said bridge means further including first and second impedance means, said first impedance means being connected to the cathode of said first rectifier means and said second impedance means being connected between said first impedance means and the anode of said second rectifier means;

clock means connected to the junction between said first and second impedance means for producing first and second pulse trains, said first and second pulse trains having a repetition rate dependent upon the voltage at the junction between said first and second impedance, and said first train consisting of positive pulses having a peak voltage more negative than the peak positive voltage of said unregulated alternating signal appearing at the junction between said first and second rectifier means and said second train consisting of negative pulses having a peak voltage more positive than the peak negative voltage of said unregulated alternating signal appearing at the junction between said first and second rectifier means; and first connection means supplying said first pulse train to the junction between said first rectifier means and said first impedance means, and second connection means supplying said second pulse train to the junction between said second rectifier means and said second impedance means.

2. Apparatus according to claim 1 wherein said first and second rectifier means are diodes.

3. Apparatus according to claim 1 wherein said first and second connection means each includes a capacitor.

4. Apparatus according to claim 3 wherein said first and second rectifier means are diodes.

5. Apparatus according to claim 1 wherein said clock means includes a supply of D.C. voltage, means connected to the junction between said first and second impedance means for altering said D.C. voltage in accordance with the voltage appearing at said junction between said first and second impedance means, and voltage controlled clock means responsive to the D.C. voltage from said supply for generating said first and second pulse trains.

6. Apparatus according to claim 5 wherein said voltage controlled clock means includes a voltage controlled clock responsive to said D.C. voltage from said supply to generate a signal having a frequency dependent upon the voltage from said supply, and logic means connected to said clock to receive said last-named signal for producing said first and second pulse trains having repetition rates synchronous with the frequency of said last-named signal.

7. Apparatus according to claim 6 wherein said first and second connection means each includes a capacitor.

8. Apparatus according to claim 7 wherein said first and second rectifier means are diodes.

* * * * *